J. B. GRIFFIN.
FLEXIBLE TRIPPING DEVICE FOR PHONOGRAPHS.
APPLICATION FILED DEC. 22, 1919.

1,348,358.

Patented Aug. 3, 1920.

Inventor
John B. Griffin.
By Ralzemond A. Parker
Attorney

J. B. GRIFFIN.
FLEXIBLE TRIPPING DEVICE FOR PHONOGRAPHS.
APPLICATION FILED DEC. 22, 1919.
1,348,358.
Patented Aug. 3, 1920.
2 SHEETS—SHEET 2.
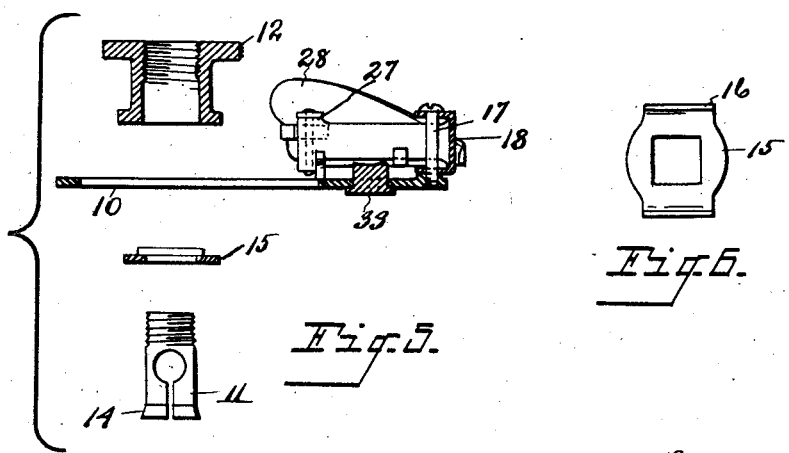
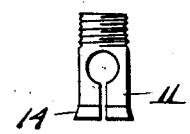
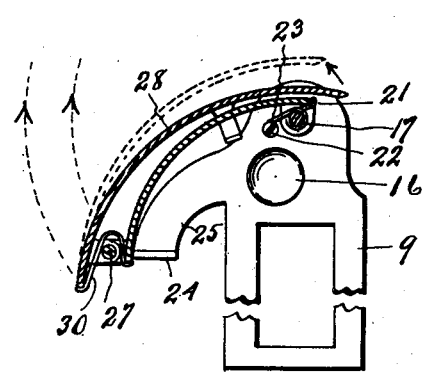
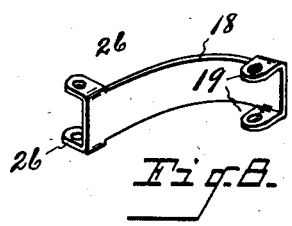
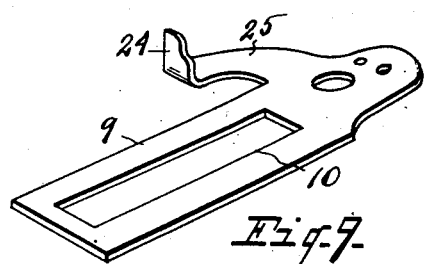
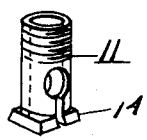
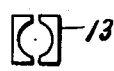
Inventor
John B. Griffin.
By Ralzemond A. Parker
Attorney

UNITED STATES PATENT OFFICE.

JOHN B. GRIFFIN, OF MAPLE HILL, NEWINGTON, CONNECTICUT.

FLEXIBLE TRIPPING DEVICE FOR PHONOGRAPHS.

1,348,358.

Specification of Letters Patent.

Patented Aug. 3, 1920.

Application filed December 22, 1919. Serial No. 346,608.

*To all whom it may concern:*

Be it known that I, JOHN B. GRIFFIN, a citizen of the United States, residing at Maple Hill, Newington, county of Hartford, State of Connecticut, have invented a certain new and useful Improvement in Flexible Tripping Devices for Phonographs, and declare the following to be a full, clear, and exact description of the same, such as will enable others skilled in the art to which it pertains to make and use the same, reference being had to the accompanying drawings, which form a part of this specification.

This invention relates to tripping devices for use in conjunction with phonograph repeating mechanisms.

In applicant's application for patent, Serial No. 246,022, filed July 22, 1918 a repeating mechanism for use with phonographs is shown. This repeating mechanism is provided with a grooved roller adapted to be engaged by a wedge-shaped tripping head which tripping head is carried by a radially-extending arm mounted on the axle of the record. This grooved roller when it is engaged by said tripping head rides upwardly over the inclined face of said head and lifts the repeating mechanism and the needle carried thereby from the record. The tripping head shown in application No. 246,022, though curved to allow for the curvature of the groove of the record, is a rigid member and consequently there is a certain amount of side thrust on the needle before the needle is raised the required distance to lift it completely from within the groove of the record. This side thrust on the needle as the grooved roller rides upward over the inclined plane of the wedge-shaped tripping head not only is undesirable, insofar as its effect on the record itself is concerned, but in certain classes of needles, as for instance, the Victor Tung-stone stylus needle, the point of the needle is bent and oftentimes broken as the result thereof. To overcome this difficulty, the present form of yielding tripping device was developed.

An object of this invention is to provide a tripping device which, irrespective of the size of the record or curvature of the spiral groove imprinted thereon, will permit the needle carried by the reproducer to follow accurately in the groove of the record, without side thrust, during the time that the grooved roller carried by the repeating mechanism is in engagement with the wedge-shaped tripping head of the device.

In the drawings,—

Fig. 5 is a view of my device partly in section showing certain parts separated from each other so as to illustrate the manner of assembly.

Fig. 6 is a plan view of the base plate 15.

Fig. 7 is an enlarged plan view partly broken away and partly in section.

Fig. 8 is an elevation of the curved member 18 upon which the tripping head is mounted.

Fig. 9 is a plan view of the radial arm which is carried by the axle of the record.

Fig. 10 is an elevation of the split sleeve which engages the axle of the record direct.

Fig. 11 is an end view of the split sleeve.

Figure 3:
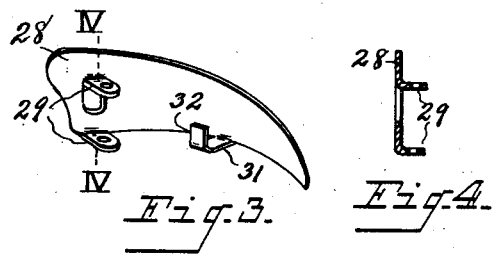
Fig. 3 is a side elevation of the wedge-shaped tripping head.
Figure 4:
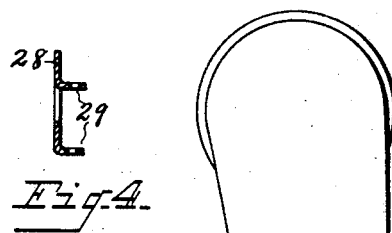
Fig. 4 is a sectional view taken on the line IV—IV of Fig. 3.

The repeating mechanism in conjunction with which this device is adapted for use is carried by the reproducer arm of the phonograph. A part of said repeating mechanism consists of a pivotally-mounted lever which carries a grooved roller mounted on a horizontal axis. This grooved roller is so positioned that during the rotation of the record it clears the surface thereof, but is itself adapted to be engaged by the wedge-shaped head of the tripping device mounted on the axle of the record for rotation therewith. Upon the engagement of this roller by the said tripping head the reproducing device and the needle carried thereby is lifted from the surface of the record and as the roller leaves the tripping head certain mechanism of the repeating device is actuated to carry the reproducing arm outward at a tangent from the center of the record. This is the subject of applicant's former application for patent.

The groove of the phonograph record is in the form of a spiral constantly approaching the center of the record. Therefore any particular arc of such groove, no matter how limited, will not form the arc of a perfect circle. Moreover, the extent of curvature will vary in records of varying size. Therefore, if a rigid tripping device is provided for use with all forms of records, even though the curvature of the tripping head might conform to the curvature of the groove on certain records, it would not conform to the curvature in all of them. The probability is that there would be a side thrust in all cases owing to the spiral character of the groove, but there would certainly be a side thrust in some cases. This side thrust is of such a character that certain needles now widely used which have a fine narrowed point would be bent or broken. A yielding tripping device, or rather a tripping device in which the tripping head is yieldingly positioned, is therefore here provided in form as follows:

Reference character 1 indicates the reproducer arm; 2, the reproducing mechanism; 3, the needle, and 4, a repeating mechanism carried by the reproducing arm. 5 is a grooved roller carried by the repeating mechanism. 6 indicates the record and 7 the turn-table upon which the record rests and 8 the axle upon which the record is mounted for rotation therewith.

The tripping mechanism proper which forms the subject of this invention consists in a radial arm 9. This arm 9 is longitudinally slotted at 10 to provide for adjustment outwardly from the axle of the record. Means are provided for mounting this arm 9 upon the axle of the record which means consists of a split sleeve 11 upwardly threaded to be received within a thumb nut 12 adapted to receive the same. This split sleeve 11 is provided at its lower extremity with a laterally projecting flange 13 which flange has a cam edge 14. There is further provided a centrally-perforated base plate 15 with upwardly formed side flanges 16 which engage opposite sides of the radial arm 9 so as to hold said base plate in position.

When it is desired to fix the tripping mechanism to the axle or center stud of a phonograph after the record has been placed on the turn-table, the assembled tripping device is set down over the center stud and as the thumb nut is tightened the split sleeve 11 is pulled upwardly until the cam edges 14 provided on the laterally extending flange 13 are brought into engagement with the edges of the central opening in the base plate 15 thus forcing the two segments of the split sleeve inwardly and gripping the center stud. This holds the device firmly in position on said stud.

A rubber fillet 33 may be carried at the outer extremity of the radial arm 9 as shown, to present a non-abrasive surface to the face of the record.

Figure 1:
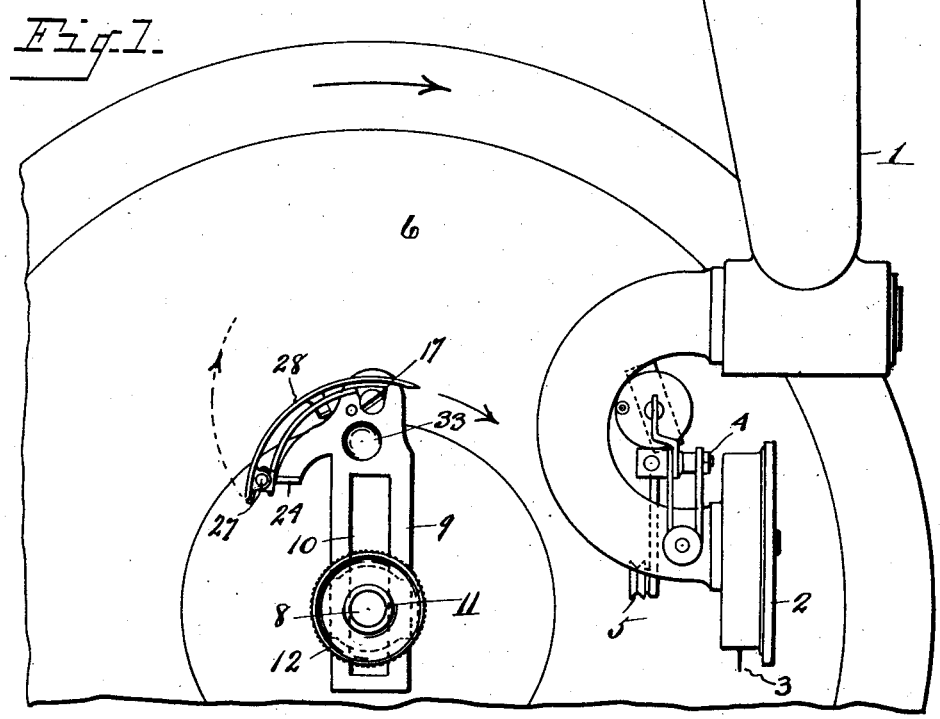
Figure 1 is a plan view of my device in conjunction with a record and reproducer arm, part of the record and turn-table being cut away.
Figure 2:
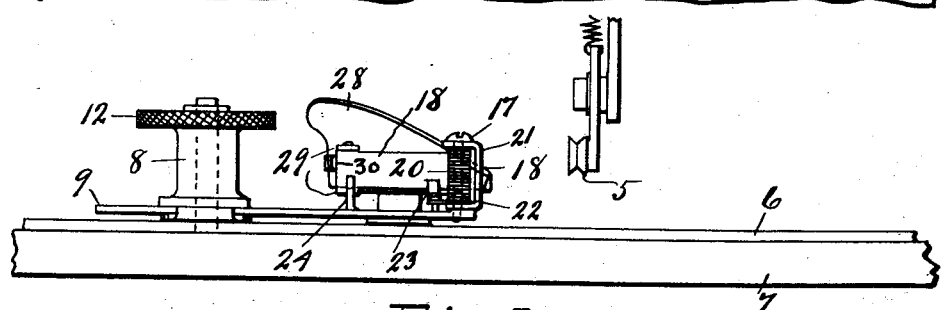
Fig. 2 is a side elevation of my device attached to the axle of the record, showing the record and turn-table.

At the outer extremity of the radial arm 9 an upright post 17 is provided on which is rotatably mounted a curved member 18. This curved member 18 is provided with inwardly-projecting perforated wings 19 which mount said member for rotation upon the post 17. A spiral spring 20 encircles said post 17, one end of which spring is bent to engage the end of curved member 18 as at 21, the other end of which, indicated as 23, is fastened to a short stud 22, which is carried by the arm 9. This holds the curved member 18 in the position shown in Fig. 7 where the rearward end of said curved member is held back against an upwardly projecting stud 24 carried by a rearwardly-extending arm 25 which is integral with the arm 9. This position is shown in Fig. 1 also. This spring permits, however, of the rearward end of the curved member 18 being pulled outwardly against the tension thereof as said member pivots on the post 17.

The rearward end of the curved member 18 is provided with outwardly-projecting, centrally perforated wings 26. These wings are adapted to receive a pivot 27 on which is mounted a wedge-shaped tripping head 28. This wedge-shaped tripping head 28 mounted upon the pivot 27, which pivot is carried in the perforations provided in the wings 26 of the curved member 18, is supported by means of inwardly-projecting perforated wings 29 integral with said tripping head. These wings carried by the wedge-shaped tripping head overlap and rest upon those provided upon the curved member so that the tripping head may pivot and swing about the pivot 27.

In order that the forward end of the wedge-shaped tripping head may be held in position, as shown in Fig. 7, a leaf spring 30 is provided, as shown in said figure. Opposite ends of this leaf spring are bent over to engage the rearward ends of the tripping head and the curved member respectively, and the spring passes around the pivot 27.

The forward end of the tripping head, however, may be moved outwardly against the compression of this spring 30 a limited distance. This outward movement is limited by an inwardly-projecting tongue 31 provided with an upright stop 32 which stop is adapted to be intercepted with the curved member 18. The character of these outward movements is shown in Fig. 7 in dotted lines.

The reason for the two distinct movements outwardly is that the grooved roller 5, as it rides upwardly over the inclined face of the tripping head may find a track easily yielding to conform to the path of the needle in the groove of the record. The restraint imposed upon the wedge-shaped tripping head by the spring 30 is scarcely noticeable. Yet, as the roller progresses further upon the inclined surface of the tripping head, the stop 32 is intercepted by the curved member 18 and further outward movement of the wedge-shaped tripping head carries with it said curved member 18 as it pivots about its axis 17. This becomes necessary in order that the needle may be raised a sufficient distance from the surface of the record as the reproducer arm starts to travel outwardly thereon at a tangent thereto.

Having thus described my device, what I desire to claim is:

1. In a phonograph, a tripping device comprising a radial arm mounted on the axle of the record for rotation therewith, a tripping head carried by said arm in such a manner as to yield outwardly therefrom.

2. In a phonograph repeating mechanism, a tripping device comprising a radial arm adapted to be mounted on the axle of the record for rotation therewith, a curved wedge-shaped tripping head carried at the outer extremity of such arm supported in such a manner as to yield outwardly when engaged by the repeating mechanism.

3. In a phonograph, a tripping device comprising a radial arm provided with means whereby the same may be fastened to the axle of the record for rotation therewith, a curved wedge-shaped tripping head pivotally carried by said arm in such a manner as to be yieldingly held in position, but adapted to be swung when force is exerted thereon outwardly about such pivot.

4. In a phonograph, an arm provided with means for being mounted on the axle of the record and radially adjustable thereon, an inclined, curved tripping head carried by said arm adapted to yield resistingly outward toward the periphery of the record.

5. In a device of the class described, a radial arm longitudinally slotted, a base plate centrally perforated provided with upwardly-projecting flanges on opposite sides thereof to engage the opposite edges of said arm, a split sleeve adapted to fit within the central perforation of said base plate and externally-threaded at the upper extremity to receive a thumb nut, said sleeve formed to fit over the axle of the record, said thumb nut, said sleeve provided with a cam flange at the lower extremity adapted to engage with the interior circumference of the opening in said base plate forcing inwardly the split-apart segments of said sleeve as the thumb nut is screwed thereon, a wedge-shaped tripping head carried at the outer extremity of said radial arm.

6. In a device of the class described, a radial arm longitudinally slotted to receive a split sleeve, said split sleeve so formed as to be received over the axle of the record, means for adjusting said sleeve longitudinally of the radial arm, means for forcing together the split-apart segments of said sleeve so as to engage the axle of the record, a wedge-shaped tripping head pivotally mounted on the outer extremity of said arm so positioned as to engage a grooved roller carried by the repeating mechanism so as to tilt said repeating mechanism, said wedge-shaped tripping head so mounted on said arm as to yieldingly conform to the changing position of the roller radially of the record.

7. In a device of the class described, a radial arm provided with means for being detachably-mounted on the axle of the record, a curved member pivoted at the outer extremity of said radial arm yieldingly held in position, a curved wedge-shaped tripping head pivotally mounted on said curved member so as to swing outwardly therefrom, means for yieldingly holding said tripping head in position.

8. In a device of the class described, a radial arm provided with means for being detachably mounted on the axle of the record, a curved member pivoted at one end of the outer end of said radial arm so as to swing outwardly toward the periphery of the record, means for yieldingly holding said curved member in position, a curved wedge-shaped tripping head pivoted to the opposite end of said curved member so as to swing outwardly, means for yieldingly holding said tripping head in position.

In testimony whereof I sign this specification.

JOHN B. GRIFFIN.